United States Patent [19]
Mitoshi et al.

[11] Patent Number: 5,167,365
[45] Date of Patent: Dec. 1, 1992

[54] AIR-CONDITIONING DEVICE

[75] Inventors: Masahiro Mitoshi, Kariya; Shigeki Harada, Toyota, both of Japan

[73] Assignee: Nippondenso Co., Ltd., Kariya City, Japan

[21] Appl. No.: 748,936

[22] Filed: Aug. 23, 1991

[30] Foreign Application Priority Data

Aug. 24, 1990 [JP] Japan .................. 2-223374

[51] Int. Cl.⁵ .................................. F24F 7/00
[52] U.S. Cl. ......................... 236/49.3; 62/157; 395/61
[58] Field of Search .............. 165/12, 16; 236/49.3; 62/157; 395/61, 900

[56] References Cited

U.S. PATENT DOCUMENTS

| | | | |
|---|---|---|---|
| 4,311,188 | 1/1982 | Kojima et al. | 165/43 |
| 4,407,446 | 10/1983 | Iijima et al. | 165/42 |
| 4,460,035 | 7/1984 | Mizote et al. | 165/16 |
| 4,738,396 | 4/1988 | Doi et al. | 165/16 |
| 4,777,585 | 10/1988 | Kokawa | 395/61 |
| 4,914,924 | 4/1990 | Takahashi | 165/43 |
| 4,919,195 | 4/1990 | Tanino | 165/16 |
| 5,027,305 | 6/1991 | Tanaka et al. | 395/61 |

FOREIGN PATENT DOCUMENTS

| | | |
|---|---|---|
| 60-12330 | 1/1985 | Japan . |
| 60-28685 | 7/1985 | Japan . |
| 63-219412 | 9/1988 | Japan . |
| 64-22617 | 1/1989 | Japan . |

*Primary Examiner*—A. Michael Chambers
*Attorney, Agent, or Firm*—Cushman, Darby & Cushman

[57] ABSTRACT

A room air-conditioning device controls the temperature of a room without making people in the room uncomfortable even during a transient period in which an influence of a disturbance is conspicuous. The air-conditioning device comprises a blower drive unit, a temperature detector for detecting the temperature of air supplied by a blower, a temperature setting unit for setting a target temperature of air, a temperature information operation unit for providing temperature information to be provided to a temperature adjusting unit and the blower drive unit, according to the signals from the temperature detector and temperature setting unit, an elapsed time operation unit for calculating an elapsed time of the operation of the air-conditioning device; and a blower drive voltage setting unit for providing a blower drive voltage signal according to the temperature information and elapsed time.

6 Claims, 9 Drawing Sheets

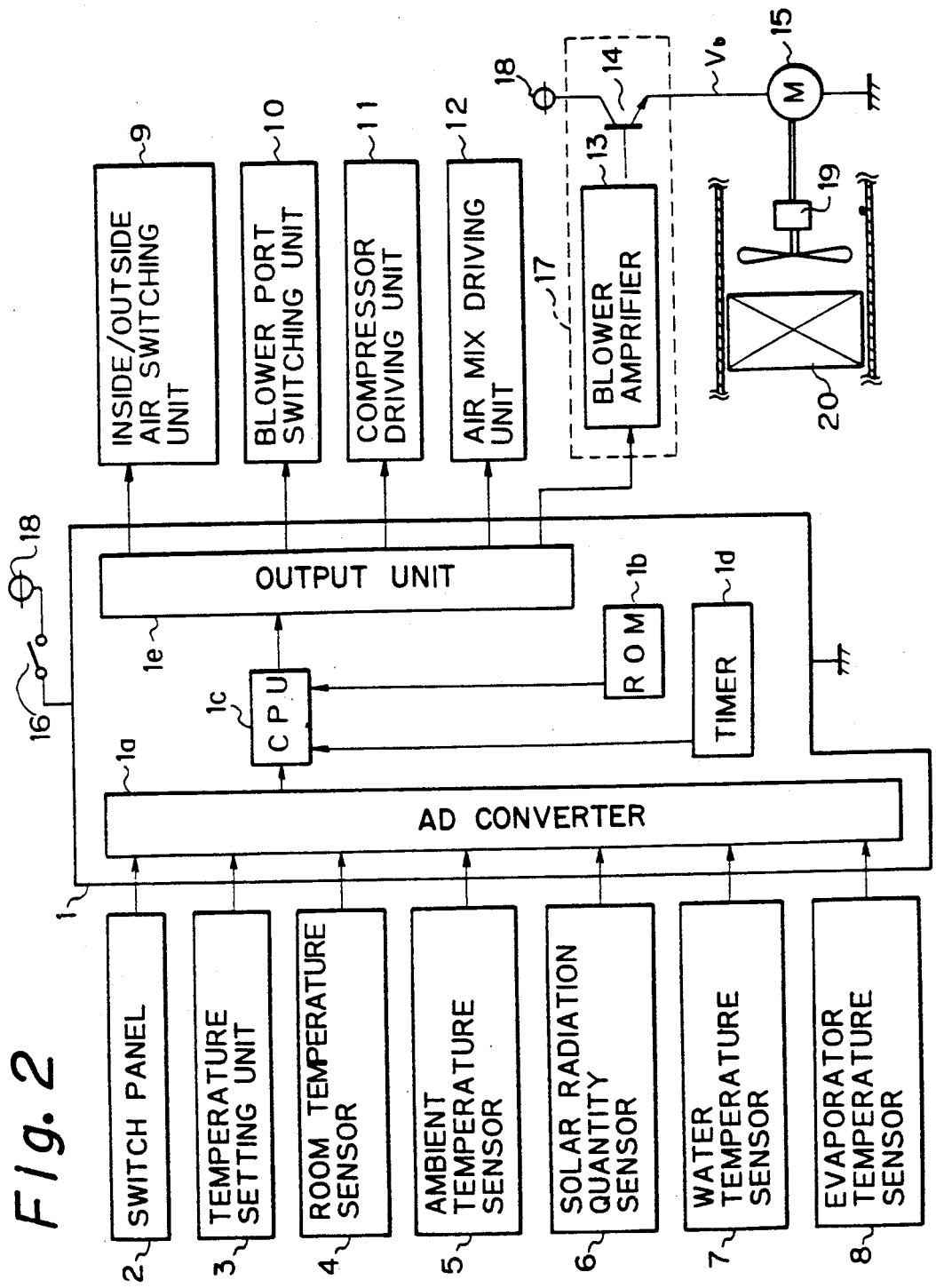

REQUIRED BLOW TEMPERATURE $T_{oo}$ (°C)

ELAPSED TIME t (minutes)

BLOWER VOLTAGE $V_b$ (V)

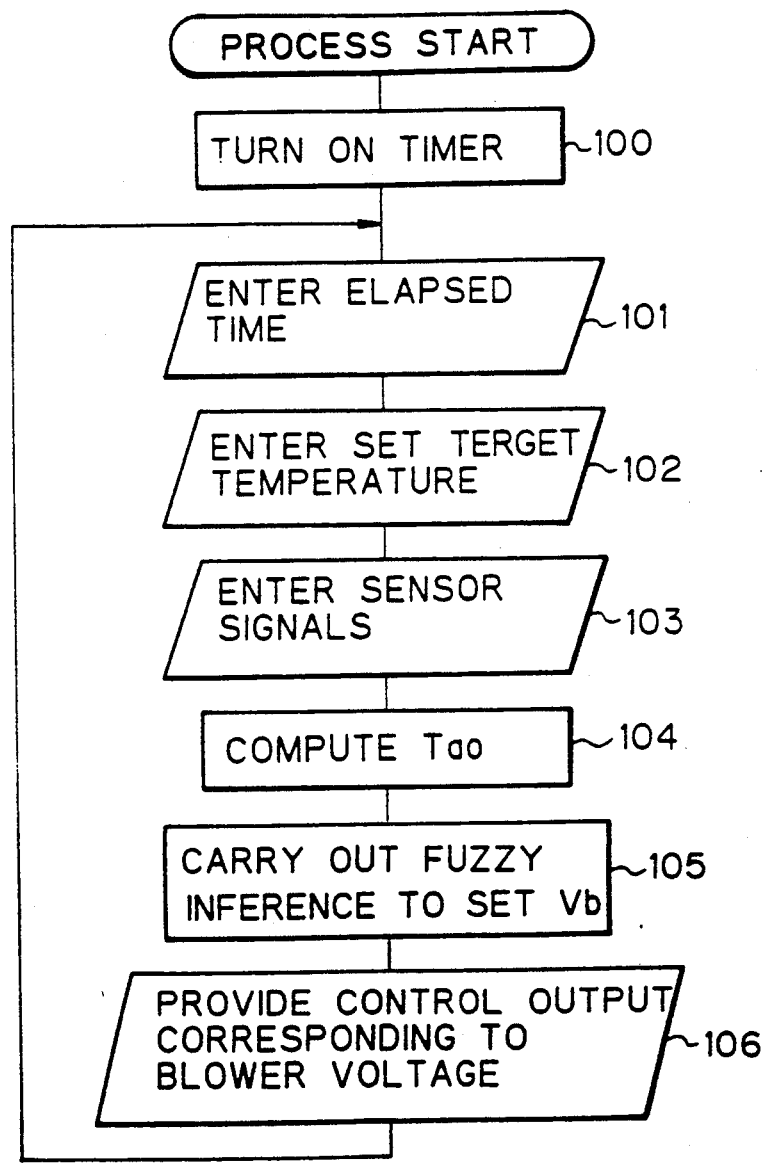

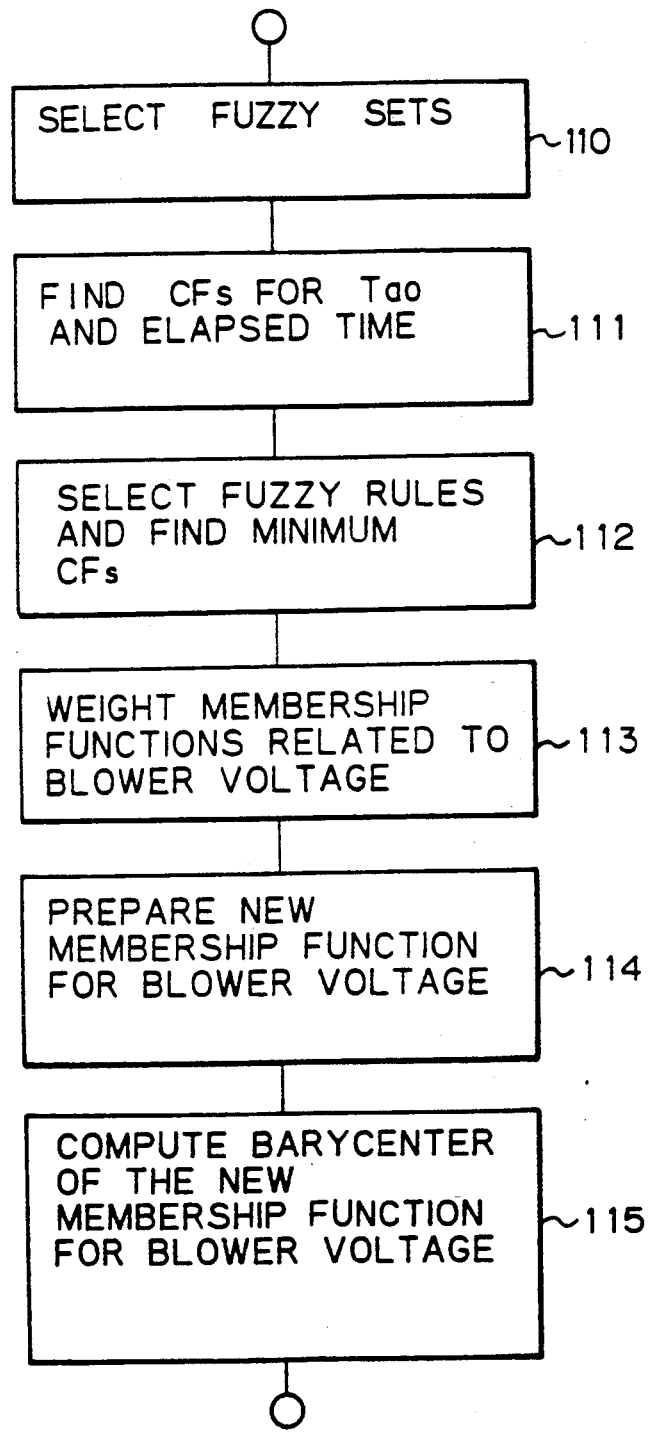

Fig. 9A
Fig. 9
| Fig. 9A | Fig. 9B | Fig. 9C |
Tao (°C)   ELAPSED TIME t (MINUTES)
(10) IF (Tao = NS & t = TZO) THEN (Vb = MH)
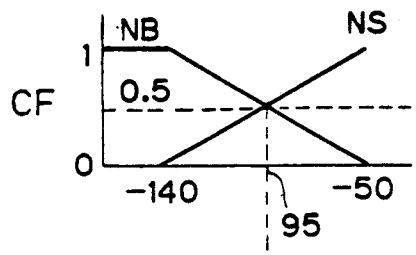
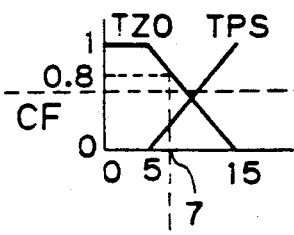
(11) IF (Tao = NS & t = TPS) THEN (Vb = ML)
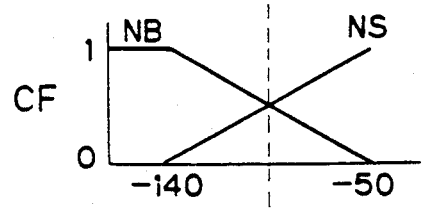
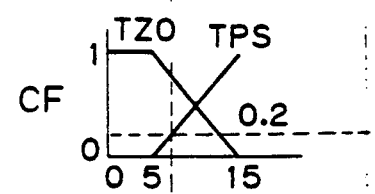
(13) IF (Tao = NB & t = TZO) THEN (Vb = HI)
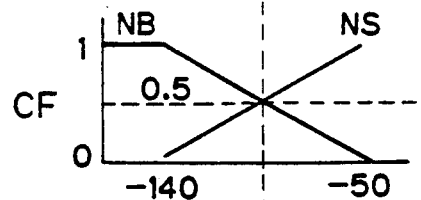
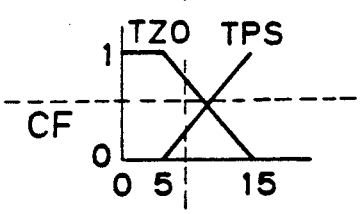
(14) IF (Tao = NB & t = TPS) THEN (Vb = HI)
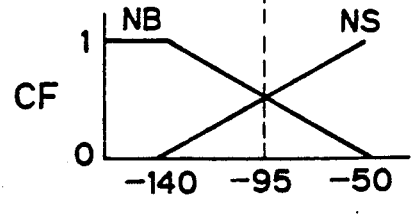
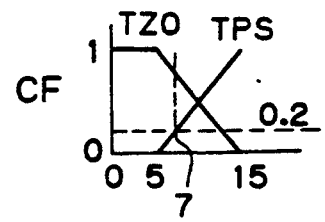

1

AIR-CONDITIONING DEVICE

BACKGROUND OF THE INVENTION

1. Field of the Invention

The present invention relates to a room air-conditioning device, particularly an air-conditioning device for a vehicle, which can cope with the effect of a disturbance therein.

2. Description of the Related Art

An example of a conventional air-conditioning device for a vehicle is disclosed in, for example, Japanese Examined Patent Publication No. 60-28685. The device of this disclosure receives signals from sensors for detecting a set target temperature, a room temperature, an ambient temperature, and a quantity of solar radiation, multiplies the signals by proper gains, carries out additions and subtractions of the multiplied results, to find a linear combination value of the input signals, and according to the linear combination value, controls a blow rate of air into the room of a vehicle to thereby control the room temperature of the vehicle.

The linear combination value (a required blow temperature Tao) is calculated from the set target temperature "tset," room temperature "adtr," ambient temperature "adtam," and the quantity of solar radiation "adst" as parameters, through the following equation:

$$Tao = A \times tset - B \times adtr + C \times adtam + D \times adst + E,$$

where the constants A through E are gains, and based on the calculated required blow temperature Tao, the room temperature of the vehicle is controlled.

The blow rate of air controlled according to the required blow temperature Tao may sometimes suddenly change, to make passengers in the vehicle uncomfortable, when any one of the parameters (the input signals) is suddenly changed due to the type of disturbance that frequently occurs during a transient period and directly influences the calculation of the required blow temperature Tao.

SUMMARY OF THE INVENTION

An object of the invention is to provide an air-conditioning device which can control the room temperature of a vehicle without making passengers in the vehicle uncomfortable even during a transient period in which the influence of a disturbance is high.

To accomplish this object, an air-conditioning device according to an aspect of the invention comprises, as shown in FIG. 1:

a blower for blowing air into a room;

a temperature adjusting means for adjusting the temperature of air passing through the blower;

a blower drive means for applying a driving voltage to the blower;

a temperature detection means for detecting the temperature of the temperature adjusted air and providing a temperature signal;

a temperature setting means for setting a target temperature of the temperature adjusted air and providing a target temperature signal;

a temperature information operation means for providing, according to signals from the temperature detection means and temperature setting means, temperature information involving a control target belonging to one of a center region, intermediate regions on both sides of the center region, and edge regions external to the intermediate regions, and providing control quantities to the temperature adjusting means and blower driving means;

an elapsed time operation means for calculating an elapsed time from an operation start time of the air-conditioning device; and a blower voltage setting means for providing the blower drive means with a blower voltage signal according to the temperature information and elapsed time, the blower drive voltage signal being set to become smaller as the elapsed time becomes larger if the temperature information belongs to any one of the intermediate regions.

An air-conditioning device according to another aspect of the invention comprises:

a voltage application means for applying a voltage to a blower for blowing air into a room;

a temperature adjusting means for adjusting the temperature of outside air fed by the blower according to a required temperature adjusting ratio;

a detection means for detecting temperature data related to an ambient temperature, a room temperature, and a target temperature;

a means for calculating temperature information (Tao) indicating the required temperature adjusting ratio according to the temperature data;

a timer means for measuring an elapsed time (t) from the start of the blower to the present moment;

a first storage means for storing membership functions that define certainty factors (CFs) related to the temperature information (Tao) and elapsed time (t);

a second storage means for storing fuzzy rules for specifying, according to the temperature information (Tao) and elapsed time (t), fuzzy sets related to the voltage to be applied to the blower;

a voltage setting means for receiving, as input information, the temperature information and the elapsed time measured by the timer means, and according to the input information, carrying out a fuzzy inference with use of the membership functions and fuzzy rules stored in the first and second storage means, and setting the voltage to be applied to the blower driving means; and a voltage applying means for applying the voltage set by the voltage setting means to the blower drive means.

According to the above arrangement, the detection means detects the temperature data related to the ambient temperature and room temperature. The temperature setting means sets the target temperature. The elapsed time measuring means measures the elapsed time from the start of the device to the present moment. The blower driving voltage setting means receives, as input information, the temperature information (Tao) computed according to the temperature data detected by the detection means and the elapsed time (t) measured by the timer means, carries out a fuzzy inference with the use of the membership functions and fuzzy rules stored in the storage means, and determines a proper voltage to be applied to the blower driving means. The proper voltage is determined according to the progress of the cooling of the room by the cooling means, i.e., according to an elapsed time of the cooling.

The fuzzy inference for setting the voltage to be applied to the blower driving means is carried out with due consideration of whether the cooling is progressing in a transient period or has entered a stable period, according to the input information, i.e., the temperature information and elapsed time. Even during the transient period of the cooling in which an influence of a disturbance is conspicuous, the present invention smoothly changes the voltage applied to the blower drive means with no sudden change in the voltage. This voltage to be applied to the blower drive means may be optionally and precisely changed by changing the membership functions and fuzzy rules.

BRIEF DESCRIPTION OF THE DRAWINGS

FIG. 2 is a block diagram showing an arrangement of an embodiment of the invention;

FIG. 4 is a flowchart showing control procedures carried out in a controller of FIG. 1;

FIG. 5 is a flowchart showing procedures of a fuzzy inference;

FIG. 9 is an explanatory view showing a fuzzy inference according to the embodiment of the invention.

DESCRIPTION OF THE PREFERRED EMBODIMENTS

Figure 1:
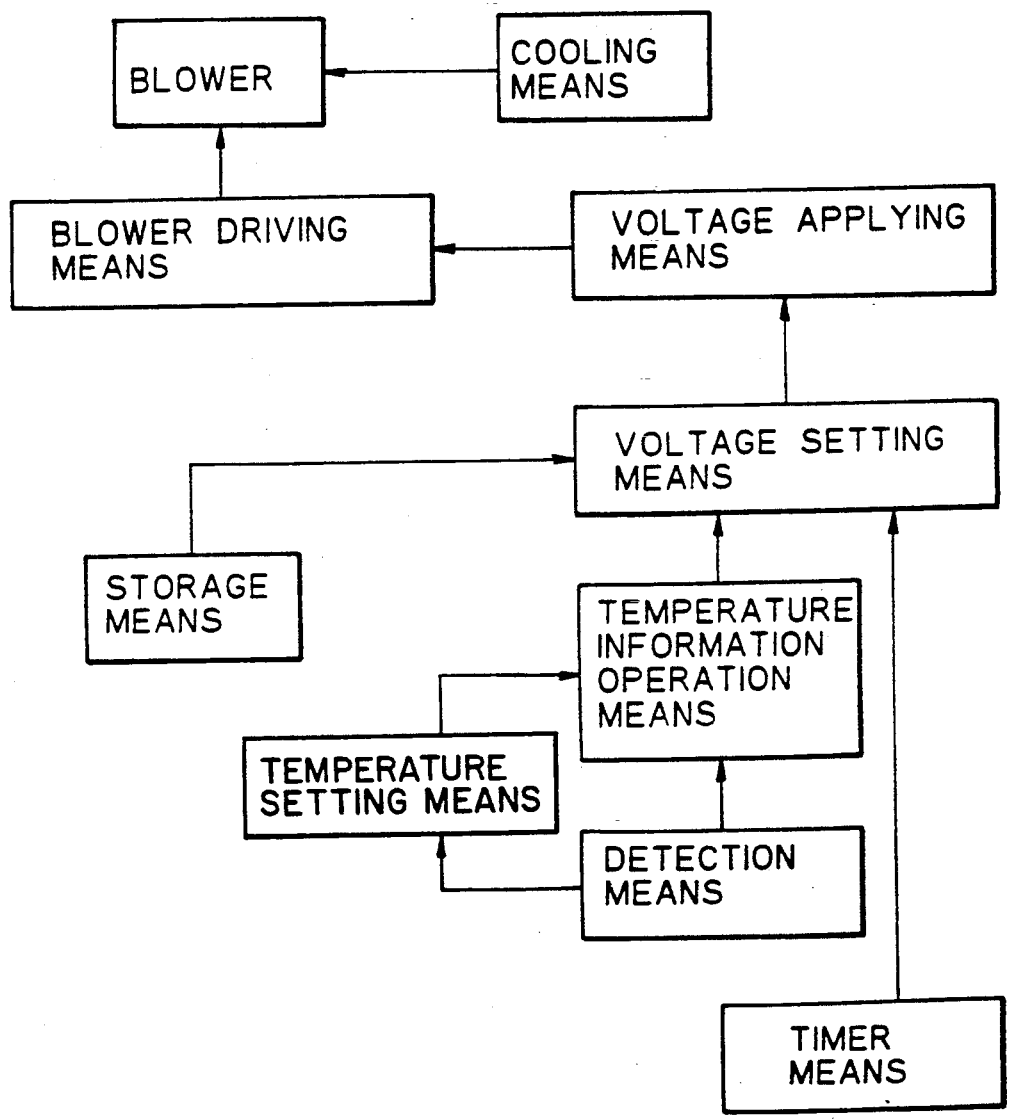
FIG. 1 is a block diagram schematically showing the invention.

An embodiment of the invention will be explained with reference to the drawings. An air-conditioning device according to the invention is applicable for every kind of air-conditioning of a human living space. In the following explanation, the air-conditioning device of the invention is applied for the air-conditioning of a room of a vehicle.

In this embodiment, a required blow temperature Tao (corresponding to the temperature information) is an input variable used for preventing a direct influence of a disturbance on the control of an airflow. A voltage applied to a blower is determined according to a mutual relationship of the required blow temperature Tao and an elapsed time measured from the switching ON of an ignition key. The embodiment will be now explained with reference to the block diagram of FIG. 2.

In the figure, a controller 1 comprises an analog-to-digital converter (A/D converter) 1a for converting sensor signals (analog signals) provided by sensors into digital signals; a ROM 1b (corresponding to the storage means) for storing a plurality of fuzzy rules and membership functions used for a fuzzy inference to be explained later; a central processing unit (CPU) for computing control quantities for external units; a timer 1d (corresponding to the timer means) for measuring an elapsed time from the turning ON of an ignition switch 16; and an output unit 1e for providing control signals to the external units in response to the control quantities computed by the CPU 1c. The CPU 1c corresponds to the blower voltage setting means, and the CPU 1c and ROM 1b to the temperature information operation means.

The A/D converter 1a receives signals from a switch panel 2 through which a driver of the vehicle enters an instruction such as an instruction to turn ON or OFF the air-conditioning device, a temperature setting unit 3 corresponding to the temperature setting means for providing a set target temperature, a room temperature sensor 4 for detecting the room temperature of the vehicle, an ambient temperature sensor 5 for detecting a temperature outside the vehicle, a solar radiation quantity sensor 6 for detecting the quantity of solar radiation, a water temperature sensor 7 for detecting a water temperature in a radiator, and an evaporator temperature sensor 8 for detecting the temperature of an evaporator 20. The sensor signals converted into digital signals are supplied to the CPU 1c.

The room temperature sensor 4, ambient temperature sensor 5, and solar radiation quantity sensor 6 correspond to the detection means, and the evaporator 20 corresponds to the cooling means.

The output unit 1e provides control signals to an inside/outside air switching unit 9 for driving an inside/outside air switching damper for switching the introduction of outside air and the circulation of inside air from one to another, a blow port switching unit 10 for driving a blow port damper, an air mix driving unit 12 for driving an air mix damper, a compressor drive unit 11 for driving a compressor for compressing a coolant gas, and a blower drive unit 17 (corresponding to the voltage applying means) for applying a voltage to a blower motor 15 (corresponding to the blower drive means) for driving a blower 19.

The blower drive unit 17 comprises a blower amplifier 13 and a transistor 14. The blower amplifier 13 receives the control signal from the output unit 1e, and controls a current conduction ratio of the transistor 14, thereby controlling a blower voltage Vb applied to the blower motor 15.

A vehicle power source 18 is connected to the controller 1 through the ignition switch key 16, and to the collector of the transistor 14.

Procedures for controlling a blow rate (a blower voltage) carried out by the controller 1 will be explained with reference to FIG. 2 and the flowchart of FIG. 4.

When the ignition key switch 16 is turned ON, Step 100 turns ON the timer 1d disposed in the controller 1.

In Step 101, the timer 1d provides the CPU 1c with an elapsed time measured from the turning ON of the ignition key switch 16 to the present moment.

In Step 102, the temperature setting unit 3 provides a set target temperature to the CPU 1c through the A/D converter 1a.

In Step 103, the room temperature sensor 4, ambient temperature sensor 5, solar radiation quantity sensor 6, water temperature sensor 7, and evaporator temperature sensor 8 provide signals to the CPU 1c through the A/D converter 1a.

In Step 104, the CPU 1c uses the sensor signals as parameters and computes a required blow temperature Tao with the following equation, similar to the prior art:

$$Tao = A \times tset - B \times adtr + C \times adtam + D \times adst + E \quad (1)$$

where constants A through E are gains. This equation (1) shows that the Tao may be suddenly changed when the room temperature "adtr" is suddenly changed due to a disturbance.

Step 105 sets a blower voltage Vb according to a fuzzy inference to be carried out on the basis of the required blow temperature Tao calculated in Step 104 and the elapsed time t provided to the CPU 1c in Step 101.

In Step 106, the output unit 1e provides the blower amplifier 13 with a control signal corresponding to the blower voltage Vb set in Step 105, and the process returns to Step 101.

In this way, the blower voltage Vb is controlled. The fuzzy inference carried out in Step 105 (FIG. 4) will be explained.

The membership functions stored in the ROM 1b will be explained at first.

Figure 3A:
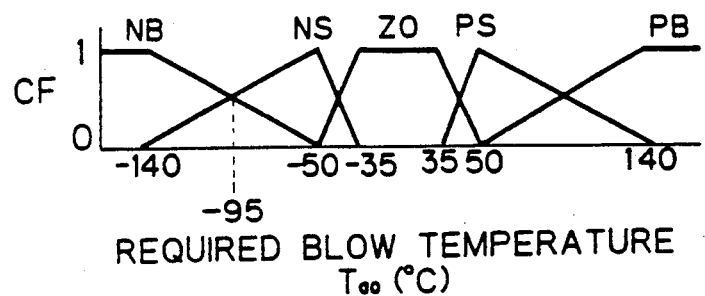
FIG. 3(a) is a characteristic diagram showing membership functions related to a required blow temperature.
Figure 3B:
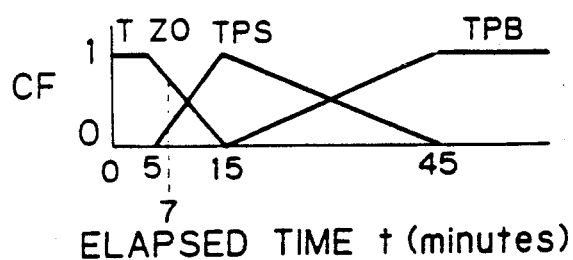
FIG. 3(b) is a characteristic diagram showing membership functions related to an elapsed time.
Figure 3C:
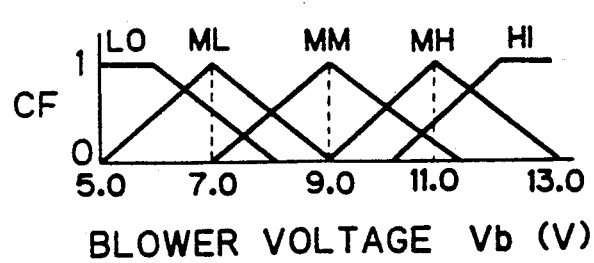
FIG. 3(c) is a characteristic diagram showing membership functions related to a blower voltage.

FIGS. 3(a) to 3(c) are views showing the membership functions employed by the fuzzy inference. In each of the membership functions, an abscissa represents input-/output values, and an ordinate represents certainty factors (CFs) corresponding to the input/output values. The membership functions will be explained in more detail.

Figure 8:
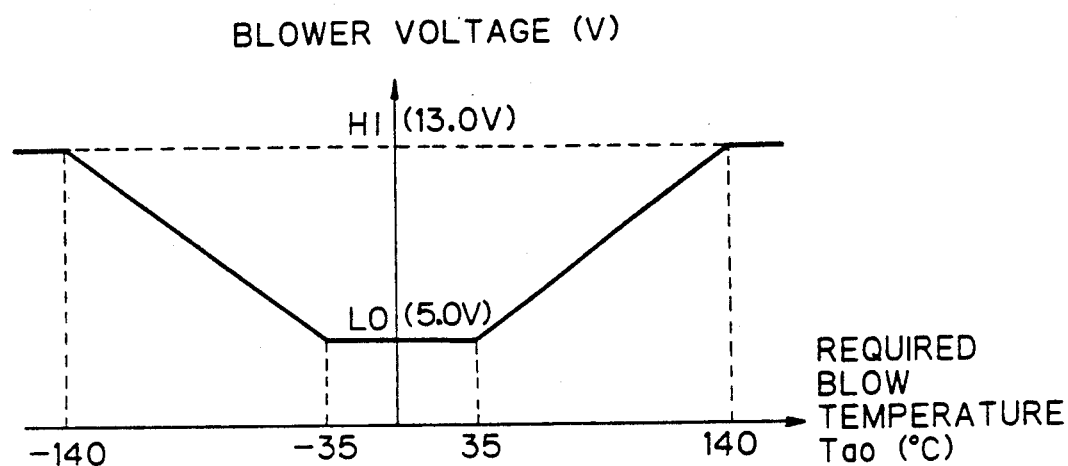
FIG. 8 is a characteristic diagram showing a required blow temperature and a blower voltage according to the conventional device.

FIG. 3(a) shows membership functions related to the required blow temperature Tao. These membership functions are determined according to the characteristic diagram of the relationship of the required blow temperature Tao and blower voltage Vb shown in FIG. 8 of the prior art and the membership functions of the blower voltage Vb to be explained later.

In FIG. 3(a), a fuzzy set of the required blow temperature Tao is divided into five fuzzy sets including a positive big (PB) fuzzy set, a positive small (PS) fuzzy set, an about zero (ZO) fuzzy set, a negative small (NS) fuzzy set, and a negative big (NB) fuzzy set. Membership functions of the respective fuzzy sets are related to the required blow temperature Tao.

The membership functions of the respective fuzzy sets relate fuzzy variables to the extent of the fuzzy sets and to CFs in the extent of the fuzzy sets, as shown in FIG. 3(a).

FIG. 3(b) shows membership functions related to the elapsed time t measured after the turning ON of the ignition key switch 16 (FIG. 2).

A fuzzy set for the elapsed time t is divided into three fuzzy sets including a time zero (TZO) fuzzy set corresponding to a start period, a time positive small (TPS) fuzzy set corresponding to a transient period in which the room temperature of the vehicle changes toward a set target temperature, and a time positive big (TPB) fuzzy set corresponding to a stable period in which the room temperature of the vehicle is maintained around the set target temperature. Membership functions of the respective fuzzy sets are related to the elapsed time t.

The membership functions of the respective fuzzy sets relate fuzzy variables to the extent of the fuzzy sets and to CFs in the extent of the fuzzy sets, as shown in FIG. 3(b).

FIG. 3(c) shows membership functions related to the blower voltage Vb applied to the blower motor 15 (FIG. 2).

A fuzzy set of the blower voltage Vb is divided into five fuzzy sets including a high (HI) fuzzy set, a medium high (MH) fuzzy set, a medium medium (MM) fuzzy set, a medium low (ML) fuzzy set, and a low (LO) fuzzy set. Membership functions of the respective fuzzy sets are related to the blower voltage Vb.

The membership functions of the respective fuzzy sets relate fuzzy variables to the extent of the fuzzy sets and to CFs in the extent of the fuzzy sets, as shown in FIG. 3(c).

Next, the fuzzy rules stored in the ROM 1b will be explained.

The fuzzy rules are set such that the blower voltage Vb is changed according to not only the required blow temperature Tao but also the elapsed time t based on the above-mentioned membership functions related to the required blow temperature Tao, elapsed time t, and blower voltage Vb. The fuzzy rules are as follows:

(1) If (Tao=PB and t=TZO) then (Vb=HI).
(2) If (Tao=PB and t=TPS) then (Vb=HI).
(3) If (Tao=PB and t=TPB) then (Vb=HI).
(4) If (Tao=PS and t=TZO) then (Vb=MH).
(5) If (Tao=PS and t=TPS) then (Vb=ML).
(6) If (Tao=PS and t=TPB) then (Vb=LO).
(7) If (Tao=ZO and t=TZO) then (Vb=LO).
(8) If (Tao=ZO and t=TPS) then (Vb=LO).
(9) If (Tao=ZO and t=TPB) then (Vb=LO).
(10) If (Tao=NS and t=TZO) then (Vb=MH).
(11) If (Tao=NS and t=TPS) then (Vb=ML).
(12) If (Tao=NS and t=TPB) then (Vb=LO).
(13) If (Tao=NB and t=TZO) then (Vb=HI).
(14) If (Tao=NB and t=TPS) then (Vb=HI).
(15) If (Tao=NB and t=TPB) then (Vb=HI).

A technical idea on which these fuzzy rules are based will be explained.

Figure 10:
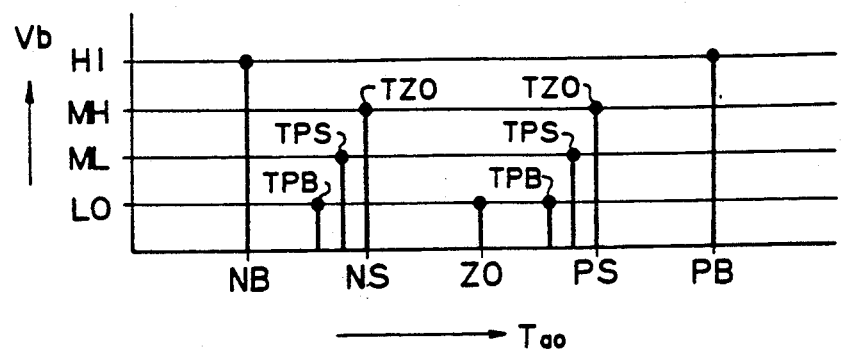
FIG. 10 is an explanatory view showing the characteristics of fuzzy rules.

As shown in FIG. 10, when the required blow temperature Tao belongs to one of the edge fuzzy sets NB and PB, the blower voltage Vb is in the fuzzy set HI. When the required blow temperature Tao belongs to the center fuzzy set ZO, the blower voltage Vb belongs to the fuzzy set LO. In any of these fuzzy sets, the required blow temperature Tao does not change in response to the elapsed time t.

When the required blow temperature Tao belongs to any one of the intermediate fuzzy sets NS and PS, the blower voltage Vb changes depending on the elapsed time t, and becomes smaller as the elapsed time t increases from the fuzzy set TZO toward the fuzzy set TPB.

Namely, when the required blow temperature Tao belongs any one of the intermediate fuzzy sets between the edge fuzzy sets and the center fuzzy set, the blower voltage Vb is changed according to the elapsed time t and reduced as the elapsed time t increases.

If the required blow temperature Tao suddenly changes due to a sudden change in the quantity of solar radiation or due to windows being opened, the required blow temperature Tao may change from NB to NS. In this case, if the elapsed time t is small (TZO), a change in the quantity of air from the blower is relatively small even if the required blow temperature Tao suddenly changes.

This is apparent from the fact that, when the required blow temperature Tao belongs to the fuzzy set NS and if the blower voltage Vb is fixed between HI and LO, the quantity of air from the blower drastically changes irrespective of the elapsed time t.

When the elapsed time t becomes larger, the required blow temperature Tao shifts toward the fuzzy set ZO. If disturbance occurs at this time, the required blow temperature Tao may be changed from ZO to NS and from NS to ZO. In this case also, the quantity of air from the blower is suppressed to be small if the elapsed time t is large (TPB), so that a change in the quantity of air from the blower will be nil or negligible.

Next, the fuzzy inference procedures carried out in Step 105 of FIG. 4 according to the fuzzy rules and membership functions will be explained with reference to the flowchart of FIG. 5.

Step 110 selects fuzzy sets to which two input variables (fuzzy variables), i.e., the elapsed time t provided by Step 101 of FIG. 4 and the required blow temperature Tao calculated in Step 104 of FIG. 4 belong.

Step 111 finds CFs for the input variables for each of the fuzzy sets selected in Step 110.

Step 112 selects fuzzy rules appropriate for the fuzzy sets to which the input variables belong, and for each of the selected fuzzy rules, compares a CF for the required blow temperature Tao with a CF for the elapsed time t, and selects the smallest CF as a minimum certainty factor CFmin.

Step 113 uses the CFmin of each of the fuzzy rules selected in Step 112 to carry out a weighting process on one of the membership functions of the blower voltage Vb specified by the latter part (after "then") of the fuzzy rule. Namely, Step 113 prepares, for each of the fuzzy sets related to the blower voltage Vb and specified by the selected fuzzy rules, a weighted membership function of the blower voltage Vb with use of the corresponding minimum CFmin.

Step 114 collects all weighted membership functions related to the blower voltage Vb for the respective selected fuzzy rules, to provide a sum of the fuzzy sets, and according to the sum of the fuzzy sets, provides a new membership function related to the blower voltage Vb.

Step 115 calculates a barycenter G of the new membership function formed in Step 114, and provides the calculated barycenter G to the output unit 1e of FIG. 2.

To speedily and simply calculate the barycenter G, the blower voltage Vb is equally divided into nine points 13, 12, 11, 10, 9, 8, 7, 6, and 5 between 5 through 13 volts, and an average of weighted values at the nine points is calculated. Namely, the barycenter G is calculated according to the following equation:

$$G = [\Sigma(Vb \times CF)]/[\Sigma(CF)] \quad (2)$$

Next, a concrete example of the fuzzy inference will be explained with reference to FIGS. 5 and 9.

FIG. 9 shows a fuzzy inference carried out to find a target blower voltage Vb with a required blow temperature Tao of −95 degrees centigrade and an elapsed time t of 7 minutes.

Step 110 of FIG. 5 finds that the required blow temperature Tao of −95 degrees centigrade belongs to two fuzzy sets NB (negative big) and NS (negative small), and that the elapsed time t of 7 minutes belongs to two fuzzy sets TZO (time zero) and TPS (time positive small).

For the selected fuzzy sets, Step 111 finds certainty factors (CFs) according to the input variables Tao and t.

Step 112 selects, among the fuzzy rules (1) through (15), the fuzzy rules (10), (11), (13), and (14) commonly involving the fuzzy sets Tao=NB, Tao=NS, t=TZO, and t=TPS. For each of the selected fuzzy rules, processes (10) through (14) of FIG. 9 are carried out. Step 112 and the steps following it will be explained in more detail.

As shown in FIG. 9 (10), Step 111 already found a CF of 0.5 for the fuzzy set NS according to the required blow temperature Tao of −95 degrees centigrade, and a CF of 0.8 for the fuzzy set TZO according to the elapsed time t of 7 minutes.

Step 112 compares the CF of 0.5 for the fuzzy set NS with the CF of 0.8 for the fuzzy set TZO, and selects the smaller CF 0.5 for the fuzzy set NS as a CFmin.

Step 113 uses this CFmin and the membership function MH (medium high) of the blower voltage Vb specified by the fuzzy rule (10), and carries out a weighting process to provide a weighted membership function MH. The weighting process is also carried out for the fuzzy rules (11), (13), and (14) to provide weighted membership functions ML (medium low) and HI (high). As a result, CFs of 0.5 for the fuzzy set MH, 0.2 for ML, 0.5 for HI, and 0.2 for HI are obtained for the blower voltage Vb.

Step 114 combines the weighted membership functions MH, ML, and HI related to the blower voltage Vb for the fuzzy rules (10), (11), (13), and (14), and forms a sum of the fuzzy sets, i.e., a new membership function related to the blower voltage Vb. Here, to form the new membership function, Step 114 selects the maximums of the CFs of the membership functions ML, MH, and HI. As a result, CFs of 0.2 for ML, 0.5 for MH, and 0.5 for HI are obtained as shown in the right side of FIG. 9.

Step 115 calculates a barycenter G of the new membership function related to the blower voltage Vb according to the equation (2). Namely, the following is calculated for the example of FIG. 9:

$$\Sigma(Vb \times CF) = 13 \times 0.5 + 12 \times 0.4 + 11 \times 0.5 + 10 \times 0.25 +$$
$$9 \times 0 + 8 \times 0.1 + 7 \times 0.2 + 6 \times 0.1 + 5 \times 0 = 22.1$$

where 13, 12, 11, 10, 9, 8, 7, 6, and 5 are voltages at the equally divided 9 points.

$$\Sigma(CF) = 0.5 + 0.4 + 0.5 + 0.25 + 0 + 0.1 + 0.2 + 0.1 + 0 =$$
$$2.05 + G = 22.1/2.05 = 10.8 \ (V)$$

In this way, the resultant target value (10.8 V) of the blower voltage Vb is obtained from the fuzzy inference.

Here, the shape of each membership function, i.e., the range of each fuzzy set can be optionally changed depending on situation. Namely, only by changing the range of each fuzzy set defined by a corresponding membership function, the same fuzzy rules can cope with any situation. In addition, the fuzzy rules themselves may be easily added, deleted, or changed.

Comparison of operations of the device of the invention and that of the prior art will be explained with reference to FIGS. 6 and 7.

Figure 6:
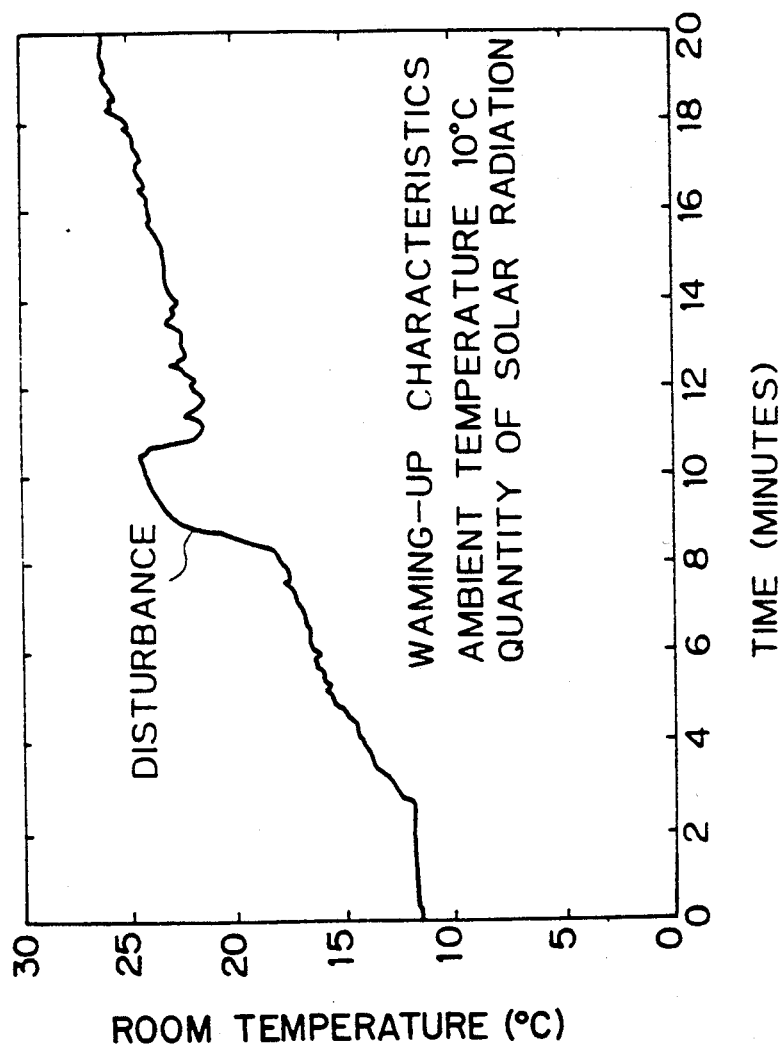
FIG. 6 is a characteristic diagram showing changes in a room temperature involving a change due to disturbance.
Figure 7:
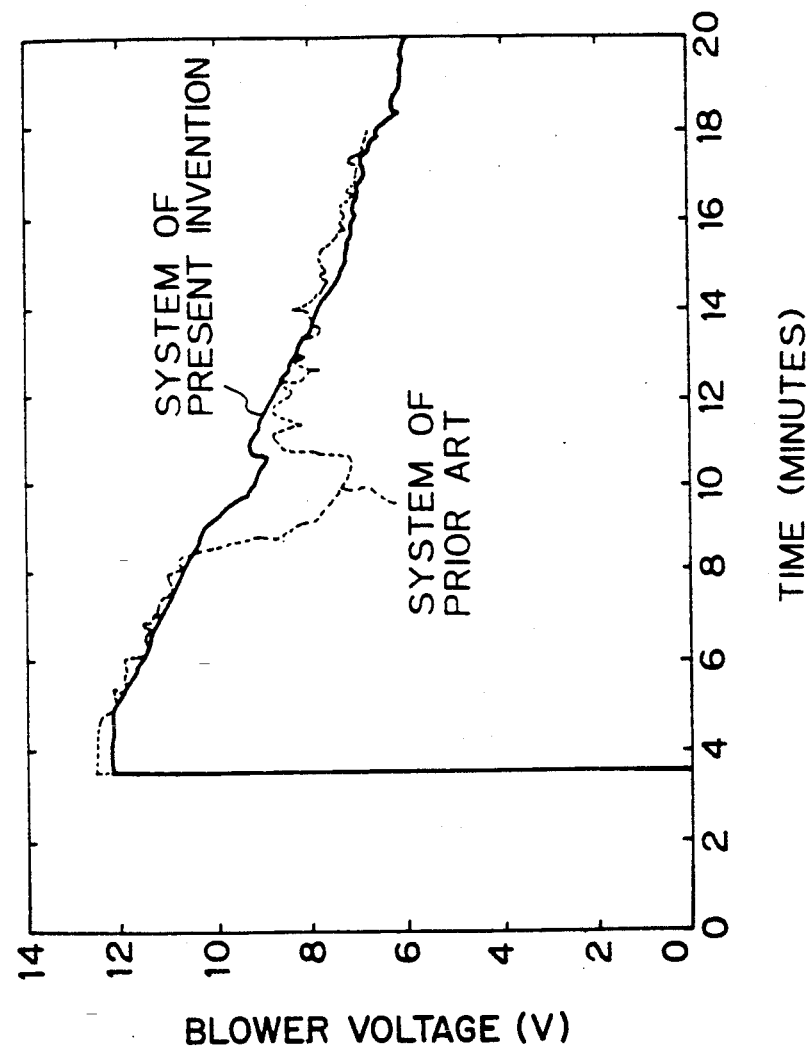
FIG. 7 is a characteristic diagram of time and blower voltage showing a comparison of operations of the device of the invention and of a conventional device.

When an airflow is changed in a room of a vehicle due to a change in a posture of persons in the vehicle, a room temperature measured by a room temperature sensor will be disturbed as shown in FIG. 6. In this case, a blower voltage Vb of the device of the invention is not much influenced by the disturbance compared with that of the prior art.

In this way, to smoothly change the blower voltage Vb, the embodiment of the invention employs membership functions and fuzzy rules not only for the required blow temperature Tao but also for the elapsed time t.

Unlike the prior art which controls the blower voltage Vb in response to only the required blow temperature Tao, the device of the invention can suppress the influence of disturbance even when the disturbance suddenly changes the required blow temperature Tao, because, in this case, the invention does not change the blower voltage Vb according to the elapsed time, and therefore, the influence of the disturbance on the blower voltage is suppressed.

It is possible, according to the invention, to prepare membership functions and fuzzy rules such that the blower voltage Vb is smoothly changed according to not only the required blow temperature Tao but also time so that an influence of disturbance may be suppressed irrespective of the kinds (ZO, NB, etc.) of fuzzy sets, the shapes (triangular, bell-like) of membership functions, or fuzzy rules.

The invention employs the required blower temperature Tao as an input variable for avoiding a direct influence of disturbance on the air-conditioning. Instead, a variable (for example, the room temperature "adtr") for calculating the required blow temperature Tao may be employed. In this case, this variable is the temperature information for calculating the required blow temperature.

As explained above, the present invention can smoothly change a voltage applied to a blower driving means during a transient period of cooling in which an influence of disturbance is conspicuous, without suddenly changing the voltage.

The invention prevents a sudden change in an airflow of a blower due to the disturbance, and properly controls the temperature of a room without making people in the room uncomfortable or causing noise.

We claim:

1. An air-conditioning device comprising:
a blower for blowing air into a room;
a temperature adjusting means for adjusting the temperature of air passing through the blower;
a blower drive means for applying a driving voltage to the blower;
a temperature detection means for detecting the temperature of the temperature adjusted air and providing a temperature signal;
a temperature setting means for setting a target temperature of the temperature adjusted air and providing a target temperature signal;
a temperature information operation means for providing, according to signals from the temperature detection means and temperature setting means, temperature information involving a control target belonging to one of a center region, intermediate regions on both sides of the center region, and edge regions external to the intermediate regions, and providing control quantities to the temperature adjusting means and blower driving means;
an elapsed time operation means for calculating an elapsed time from an operation start time of the air-conditioning device; and
a blower voltage setting means for providing the blower drive means with a blower voltage signal according to the temperature information and elapsed time, the blower driving voltage signal being set to become smaller as the elapsed time becomes larger if the temperature information belongs to any one of the intermediate regions.

2. An air-conditioning device as set forth in claim 1, wherein the blower voltage setting means sets the blower voltage signal according to a fuzzy inference carried out with the temperature information and elapsed time as input variables.

3. An air-conditioning device comprising:
a blower drive means for applying a voltage to a blower for blowing air into a room;
a temperature adjusting means for adjusting the temperature of outside air fed by the blower according to a required temperature adjusting ratio;
a detection means for detecting temperature data related to an ambient temperature, a room temperature, and a target temperature;
a means for calculating temperature information (Tao) indicating the required temperature adjusting ratio according to the temperature data;
a timer means for measuring an elapsed time (t) from the start of the blower to the present moment;
a first storage means for storing membership functions that define certainty factors (CFs) related to the temperature information (Tao) and elapsed time (t);
a second storage means for storing fuzzy rules for specifying, according to the temperature information (Tao) and elapsed time (t), fuzzy sets related to the voltage to be applied to the blower;
a voltage setting means for receiving, as input information, the temperature information and the elapsed time measured by the timer means, and according to the input information, carrying out a fuzzy inference with use of the membership functions and fuzzy rules stored in the first and second storage means, and setting the voltage to be applied to the blower driving means; and
a voltage applying means for applying the voltage set by the voltage setting means to the blower driving means.

4. An air-conditioning device as set forth in claim 3 further comprising a calculation means for calculating a required blow temperature (Tao) according to the temperature data detected by the detection means, the required blow temperature indicating the required temperature adjusting ratio.

5. An air-conditioning device as set forth in claim 1 or 3, wherein the voltage to be applied to the blower is supplied through an ignition switch (16) for starting a vehicle, and the elapsed time (t) is counted from the turning ON of the ignition switch to the present moment.

6. An air-conditioning apparatus as set forth in claim 3, wherein the fuzzy inference to be carried out in the voltage setting means is achieved with:
a means for selecting fuzzy sets to which the respective input information variables belong at the moment, according to respective membership functions;
a means for finding certainty factors (CFs) for the selected fuzzy sets;
a means for selecting fuzzy rules appropriate for the respective fuzzy sets to which the input information variables belong;
a means for selecting one of the certainty factors (CFs) for each of the selected fuzzy rules;
a means for computing, for each of the selected fuzzy rules, a weighted membership function related to the applied voltage (Vb) according to the selected CFs;
a means for finding a new membership function related to the applied voltage (Vb) according to the weighted membership functions; and
a means for calculating and providing output information according to the new membership function.

* * * * *